US012537278B2

(12) United States Patent
Abs

(10) Patent No.: US 12,537,278 B2
(45) Date of Patent: Jan. 27, 2026

(54) RF POWER COMBINER/DIVIDER

(71) Applicant: Ion Beam Applications S.A, Louvain-la-Neuve (BE)

(72) Inventor: Michel Abs, Louvain-la-Neuve (BE)

(73) Assignee: Ion Beam Applications S.A., Louvain-la-Neuve (BE)

( * ) Notice: Subject to any disclaimer, the term of this patent is extended or adjusted under 35 U.S.C. 154(b) by 433 days.

(21) Appl. No.: 18/327,389

(22) Filed: Jun. 1, 2023

(65) Prior Publication Data

US 2023/0395962 A1 Dec. 7, 2023

(30) Foreign Application Priority Data

Jun. 2, 2022 (EP) .................................... 22177051

(51) Int. Cl.
*H01P 5/16* (2006.01)
*H01P 7/06* (2006.01)

(52) U.S. Cl.
CPC . *H01P 5/16* (2013.01); *H01P 7/06* (2013.01)

(58) Field of Classification Search
CPC ................. H01P 5/16; H01P 7/06; H01P 5/12
See application file for complete search history.

(56) References Cited

U.S. PATENT DOCUMENTS 2,428,831 A 10/1947 Peterson et al.
3,091,743 A 5/1963 Wilkinson
4,035,746 A * 7/1977 Covington, Jr. .......... H01P 5/12 333/127
4,163,955 A * 8/1979 Iden .......................... H01P 5/16 333/127
5,142,253 A 8/1992 Mallavarpu et al.
10,326,191 B2 6/2019 Theveneau et al.
2004/0004522 A1 * 1/2004 Sweeney .................. H01P 5/12 333/127
2016/0190672 A1 6/2016 Gudovich et al.

FOREIGN PATENT DOCUMENTS

WO WO 2019159323 A1 8/2019

OTHER PUBLICATIONS

U.H. Gysel, “A new N-way power divider/combiner suitable for high-power applications,” IEEE MTT-S Int. Microw. Sym., pp. 116-118, May 1975.
European Search Report in counterpart European Patent Application No. 22177051, completed on Nov. 22, 2022, 7 pages.

* cited by examiner

*Primary Examiner* — Andrea Lindgren Baltzell
*Assistant Examiner* — Kimberly E Glenn
(74) *Attorney, Agent, or Firm* — Finnegan, Henderson, Farabow, Garrett & Dunner, L.L.P.

(57) ABSTRACT

An RF power combiner/divider that combines a plurality of inputs into a combined output and comprises an isolating circuit coupling the inputs to a common floating point is provided. The isolating circuit includes a grounded resonant cavity inside which transmission lines are arranged, each of the transmission lines having a first end respectively connected to one of the inputs and an opposite second end connected to a grounded resistor arranged outside of the resonant cavity. Each of the transmission lines is coupled to a coupling portion of the resonant cavity, one end of the coupling portion being connected to ground and an opposite end of the coupling portion forming the common floating point.

9 Claims, 7 Drawing Sheets

RF POWER COMBINER/DIVIDER

CROSS REFERENCE TO RELATED APPLICATIONS

This application claims priority of European patent application no. 22177051.4 filed on Jun. 2, 2022, which is incorporated herein by reference in its entirety.

TECHNICAL FIELD

The present disclosure relates to the general field of Radio-Frequency (hereafter "RF") power combiners and/or dividers.

BACKGROUND

RF power combiners are devices that combine RF signals from multiple input ports into a combined RF output signal. Conversely, RF power dividers (sometimes also called splitters) divide an RF input signal into multiple RF output signals. Most of these devices are reversible in the sense that a combiner can be used as a divider or vice versa. Such devices are well known in the art.

An exemplary power combiner/divider is known from U.S. Pat. No. 3,091,743 (sometimes called a Wilkinson combiner/divider). When used as a divider, the Wilkinson combiner uses quarter-wave transformers to split an input signal into a plurality of output signals that are in phase with each other. Resistors are connected in a star configuration to the output ports in order for the outputs to match and to provide isolation.

Wilkinson-type power divider/combiners have proven to be very useful for in-phase, equal or unequal power division and combining for applications having moderate power levels or a frequency range where the series resistors can be made sufficiently large to dissipate reasonable power levels. Because of its electrical and mechanical symmetry, its performance over moderate bandwidths has been superior to other types of divider/combiners, such as rat races and branch arm divider/combiners, for example. At higher frequencies or higher power levels, however, there has been great difficulty in building extremely accurate in-phase high power divider/combiners according to the Wilkinson principle because of the physical limitations of the resistors needed for the Wilkinson circuit. These resistors must be physically small, and it is difficult to heat sink them because of the additional shunt capacity which has the effect of degrading the performance.

Another well-known RF power combiner is the Gysel combiner (U. H. Gysel, "A new N-way power divider/combiner suitable for high-power applications," IEEE MTT-S Int. Microw. Sym., Pp. 116-118, May 1975). The Gysel combiner is an extension of the N-way combiner of Wilkinson. The main advantages of the Gysel design are the presence of external isolation loads, permitting high-power loads, easily realizable geometry, and the monitoring capability for imbalances at the output ports.

In the original Wilkinson combiner, a resistive star is connected directly between the N output ports, leading to a physically complicated arrangement. The Gysel combiner replaces the resistive star with a combination of transmission lines and shunt-connected load resistors. Transmission lines connect each output port with what is called its associated load port. All load ports are connected by means of transmission lines of characteristic impedance Z with a common floating star point. As noted above, advantages of the Gysel design are its high-power handling capability, because external high-power isolation loads can be utilized, and the possibility to monitor and adjust the imbalance of the combined RF sources.

In the Gysel power dividing/combining circuit, the line lengths of the impedance transformation line, the first connection line, and the second connection line are odd multiples of a quarter wavelength at the operating frequency ($n\lambda/2+\lambda/4$). The used frequency is the frequency of the desired high-frequency signal to be split or the frequency of the desired high-frequency signals to be combined. The Gysel dividing/combining circuit suffers, however, from a large power loss, even when the frequency of the high-frequency signal deviates from the used frequency, and from the variation in the amplitude or phase of the high-frequency signal input from the plurality of input/output terminals. Heat, which is generated when power is consumed by the terminating resistor, is propagated from the terminating resistor to the ground and is dissipated from the ground. Also, heat is generated due to conductor loss or the like in a path for transmitting high-frequency signals input from a plurality of input/output terminals, and the generated heat is transmitted to the ground via the terminating resistor. Therefore, heat is concentrated on the termination resistor, causing a temperature rise of the termination resistor, which affects the durability of the circuit.

Yet another RF power combiner/divider is known from WO 2019159323.

This power divider/combiner addresses some of the above problems by including a plurality of impedance transformation lines, one end of which is connected to a common terminal, and the other end of which is connected respectively to each of the plurality of input/output terminals, as well as a plurality of pairs of coupled transmission lines. Each pair of coupled transmission lines includes a first transmission line whose one end is connected to the other end of the impedance transformation line and whose other end is grounded, and a second transmission line whose one end is connected to the connection point and whose other end is connected to a terminating resistor which is grounded. In each pair of coupled transmission lines, the first transmission line is electrically coupled to the second transmission line.

Such a design can operate at higher powers with terminating resistors that can be water-cooled. However, the volume of this design is still high, particularly in case of a large number of inputs/outputs and/or at low RF frequencies.

There is therefore a need to simplify the design and have a more compact combiner/divider.

SUMMARY

A problem that the present disclosure solves is to provide a simplified and more compact RF power combiner/divider.

The present disclosure provides an RF power combiner to combine N input signals into a single output signal, the RF power combiner comprising N input ports connected to a common output port through N impedance matching elements, respectively and an isolating circuit coupling the N input ports to a common floating point. The isolating circuit comprises a grounded resonant cavity inside which are arranged N transmission lines, each of the N transmission lines having a first end connected to one of the N input ports and an opposite second end connected to a grounded resistor arranged outside of the resonant cavity, each of the N transmission lines being coupled to a coupling portion of the resonant cavity, one end of the coupling portion being connected to ground and an opposite end of the coupling portion forming the common floating point.

An RF power combiner according to the present disclosure will be more compact, yet allow for an efficient cooling (e.g. water cooling) of the individual resistors, and yet provide a larger bandwidth compared to the Gysel combiner, for example.

In accordance with some embodiments, the resonant cavity has a cylindrical shape, wherein the coupling portion has a cylindrical shape and is coaxial with the resonant cavity, and the N transmission lines are arranged around the coupling portion and at a coupling distance from the coupling portion.

In accordance with some embodiments, the resonant cavity has a parallelepiped shape, wherein the coupling portion has a parallelepiped shape and is coaxial with the resonant cavity, and the N transmission lines are arranged around the coupling portion and at a coupling distance from the coupling portion.

Such arrangements result in a compact power combiner which is easy to manufacture.

In accordance with some embodiments, one or more ferrite rings are arranged inside the resonant cavity and around the N transmission lines. Such arrangement results in an even more compact power combiner, particularly at lower operating frequencies.

A nominal operating frequency range of an RF power combiner according to the present disclosure is, for example, in the range of 1 MHz to 10 GHz.

A nominal output power of an RF power combiner according to the present disclosure is, for example, in the range of 1 KW to 1 MW.

BRIEF DESCRIPTION OF THE FIGURES

These and further aspects of the present disclosure will be explained in greater detail by way of examples and with reference to the accompanying drawings in which.

The drawings of the figures are neither drawn to scale nor proportioned. Generally, similar or identical components are denoted by the same reference numerals in the figures.

DETAILED DESCRIPTION

For the sake of clarity, exemplary embodiments of a 2-way, of a 4-way, and of an 8-way RF power combiner/divider according to the present disclosure will be disclosed. The present disclosure nevertheless concerns, more generally, an N-way RF power combiner/divider, wherein N is equal to or greater than two. N may, for example, have a practical value comprised between 2 and 50.

Also, for the sake of clarity, the examples disclosed hereafter will be described from a point of view of their combiner function, but they can each also be operated as a divider (sometimes called a splitter), as is the case with conventional RF power combiners/dividers using only passive components.

Figure 1:
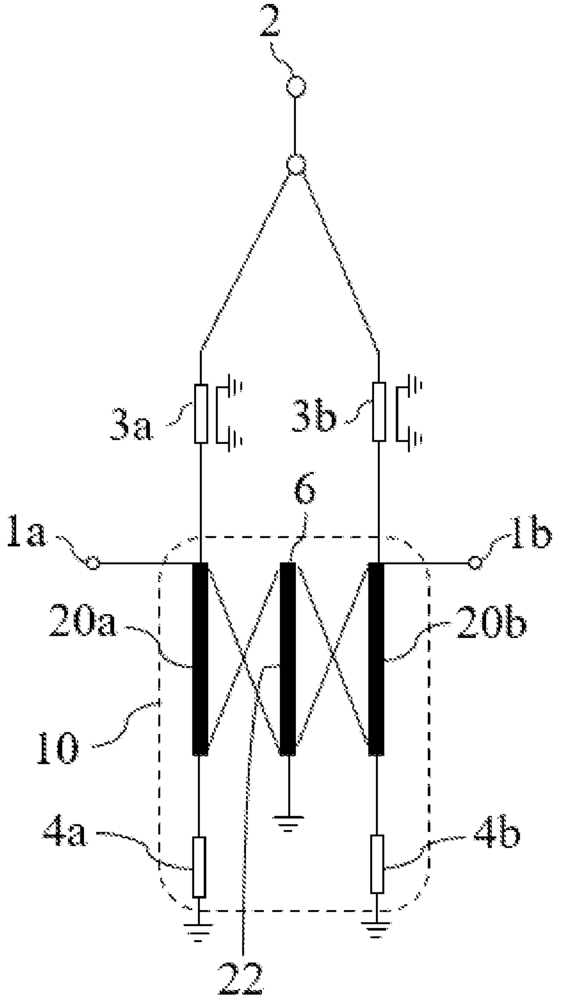
FIG. 1 shows an equivalent electrical circuit of an exemplary two-way RF power combiner according to an embodiment of the present disclosure.

FIG. 1 shows an equivalent electrical circuit of an exemplary two-way RF power combiner according to an embodiment of the present disclosure.

The equivalent electrical circuit comprises two input ports (1_a_, 1_b_), each of the two input ports being connected to a common output port (2) through, respectively, two impedance matching elements (3_a_, 3_b_), which, in this exemplary implementation, are shown as transmission lines but could alternatively also be lumped elements such as inductors, and/or capacitors, and/or transformers. This part of an RF power combiner being well known in the art, will not be described further.

Attention will now be drawn to the lower part of the combiner, more particularly to an isolating circuit (10) as shown inside a dotted line in FIG. 1.

The isolating circuit (10) includes, in this exemplary implementation, two transmission lines (20_a_, 20_b_) which are both electrically coupled to a common transmission line (22). The common transmission line (22) is grounded at one end and left floating at its opposite end to form a common floating point (6) (sometimes also called a "star point"). As is generally known in the art, transmission lines are said to be coupled (or electrically coupled) when they are close enough in proximity so that energy from one line passes to the other.

The first transmission line (20_a_) has one end connected to the first input port (1_a_) and another end connected to an individual grounded resistor (4_a_). The second transmission line (20_b_) has one end connected to the second input port (1_b_) and another end connected to an individual grounded resistor (4_b_). Each of the two transmission lines (20_a_, 20_b_) may have an exemplary electrical length of $\lambda/4$ at a nominal operating frequency of the RF power combiner.

Figure 2:
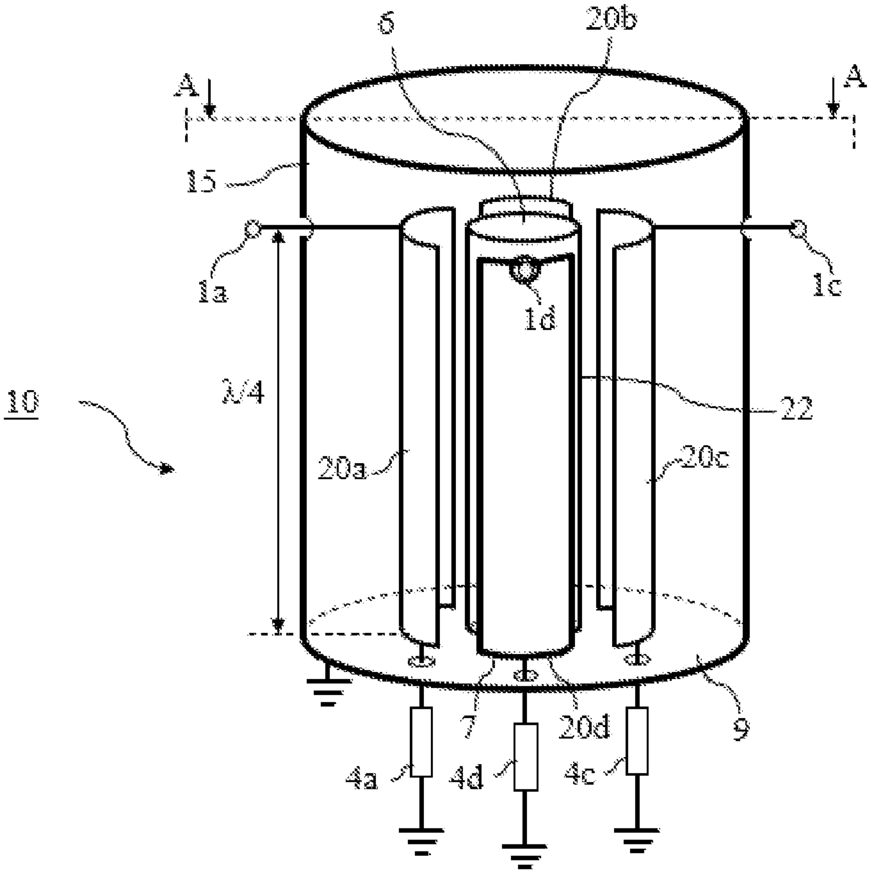
FIG. 2 schematically shows an exemplary electromechanical implementation of an isolating circuit of a four-way RF power combiner according to an embodiment of the present disclosure.

FIG. 2 schematically shows an exemplary electromechanical implementation of an isolating circuit (10) of a four-way RF power combiner according to an embodiment of the present disclosure.

The isolating circuit (10) comprises a grounded resonant cavity (15) inside which are arranged four transmission lines (20_a_, 20_b_, 20_c_, 20_d_). Each of the four transmission lines has a first end (the top end in FIG. 2) respectively connected to one of four input ports (1_a_, 1_b_ (not shown), 1_c_, 1_d_) of the combiner and an opposite second end (the bottom end in FIG. 2) respectively connected to one of four grounded resistors (4_a_, 4_b_ (not shown), 4_c_, 4_d_) which are arranged outside of the resonant cavity (15).

There are four electrical connections, respectively, between the first ends of the four transmission lines and the four input ports (1_a_, 1_b_ (not shown), 1_c_, 1_d_).

The resonant cavity (15) may comprise four through holes through which respectively pass the four electrical connections.

There are also four other electrical connections respectively between the second ends of the four transmission lines (20_a_, 20_b_, 20_c_, 20_d_) and the four grounded resistors (4_a_, 4_b_ (not shown), 4_c_, 4_d_).

The resonant cavity (15) may comprise four other holes through its base (9) through which respectively pass the four other electrical connections to the four grounded resistors (4*a*, 4*b* (not shown), 4*c*, 4*d*). This allows arrangement of the four grounded resistors (4*a*, 4*b* (not shown), 4*c*, 4*d*) outside of the resonant cavity (15) so that they can be easily cooled and/or accessed. Alternatively, the four grounded resistors (4*a*, 4*b* (not shown), 4*c*, 4*d*) may be arranged inside the resonant cavity (15).

Each of the four transmission lines (20*a*, 20*b*, 20*c*, 20*d*) is electrically coupled to a coupling portion (22) of the resonant cavity. One end of the coupling portion (22) (the bottom end in FIG. 2) is connected to ground, for example, by being electrically connected to the base (9) of the resonant cavity. An opposite end of the coupling portion (22) (the top end in FIG. 2) is forming the common floating point (6) discussed hereinabove in relation to FIG. 1. In this exemplary implementation, the resonant cavity (15) has a cylindrical shape and the coupling portion (22) has a cylindrical shape which is coaxial with the resonant cavity. As can be seen in FIG. 2, the four transmission lines (20*a*, 20*b*, 20*c*, 20*d*) are arranged around the coupling portion (22) and at a coupling distance from the coupling portion (22). In some examples, the four transmission lines have the shape of a gutter.

The four transmission lines (20*a*, 20*b*, 20*c*, 20*d*) may each have an exemplary electrical length of λ/4 at a nominal operating frequency of the RF power combiner.

Figure 3:
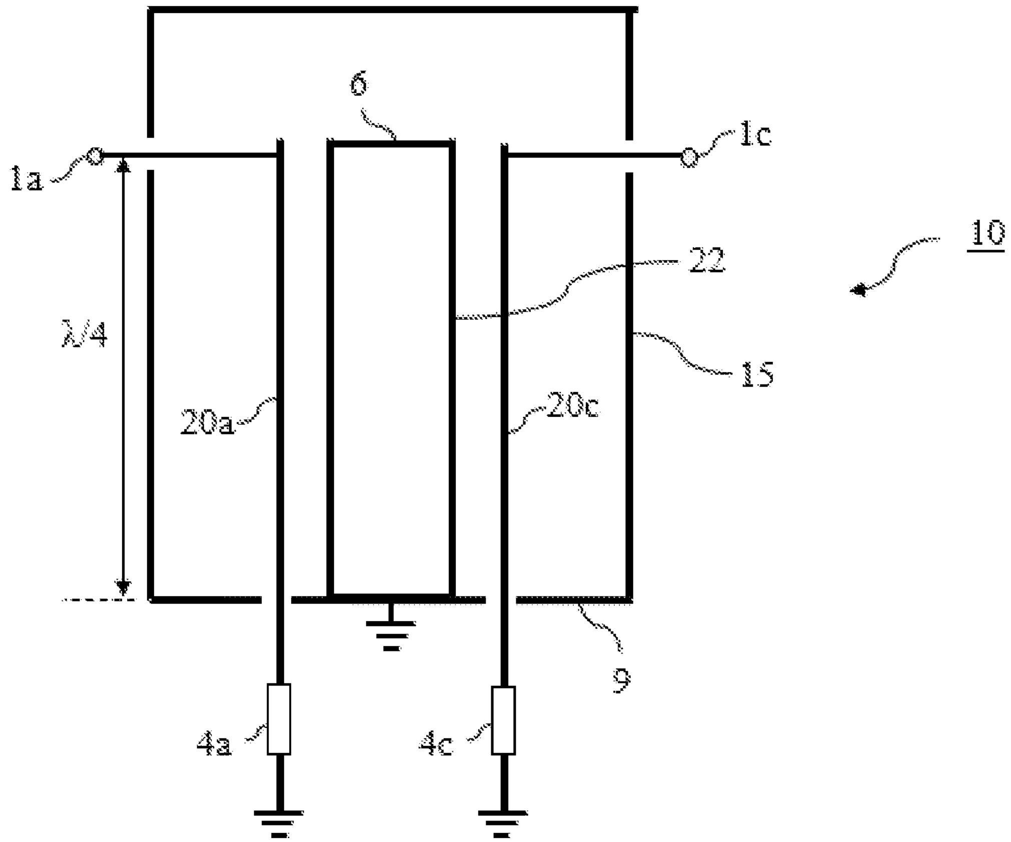
FIG. 3 shows an "A-A" cross-sectional view of the isolating circuit of FIG. 2.

FIG. 3 shows an "A-A" cross-sectional view of the isolating circuit of FIG. 2.

Figure 4:
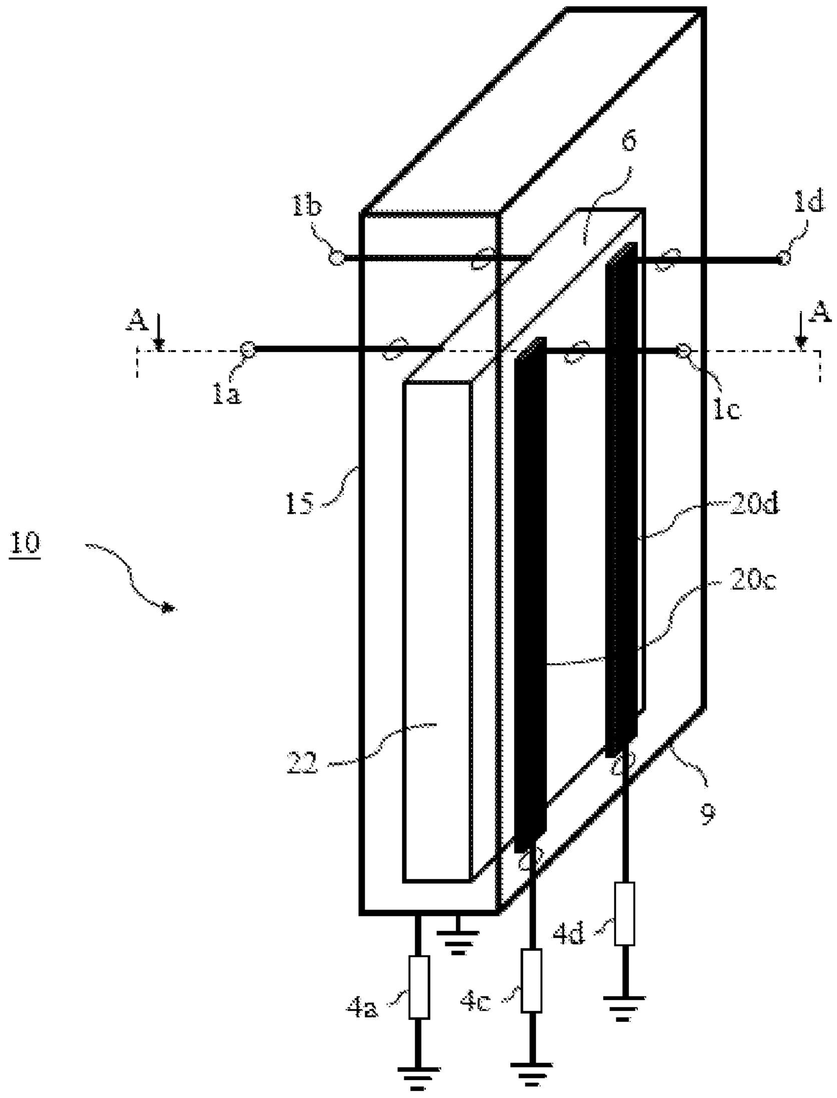
FIG. 4 schematically shows another exemplary electromechanical implementation of the isolating circuit of a four-way RF power combiner according to an embodiment of the present disclosure.

FIG. 4 schematically shows another exemplary electromechanical implementation of the isolating circuit (10) of a four-way RF power combiner according to an embodiment of the present disclosure.

The isolating circuit (10) is basically the same as the isolating circuit (10) of FIG. 2, except that the resonant cavity (15), the four transmission lines (20*a* (not shown), 20*b* (not shown), 20*c*, 20*d*) and the coupling portion (22) all have parallelepiped shapes instead of (hemi-)cylindrical shapes.

An "A-A" cross-sectional view of the isolating circuit of FIG. 4 can also be seen in FIG. 3.

Figure 5:
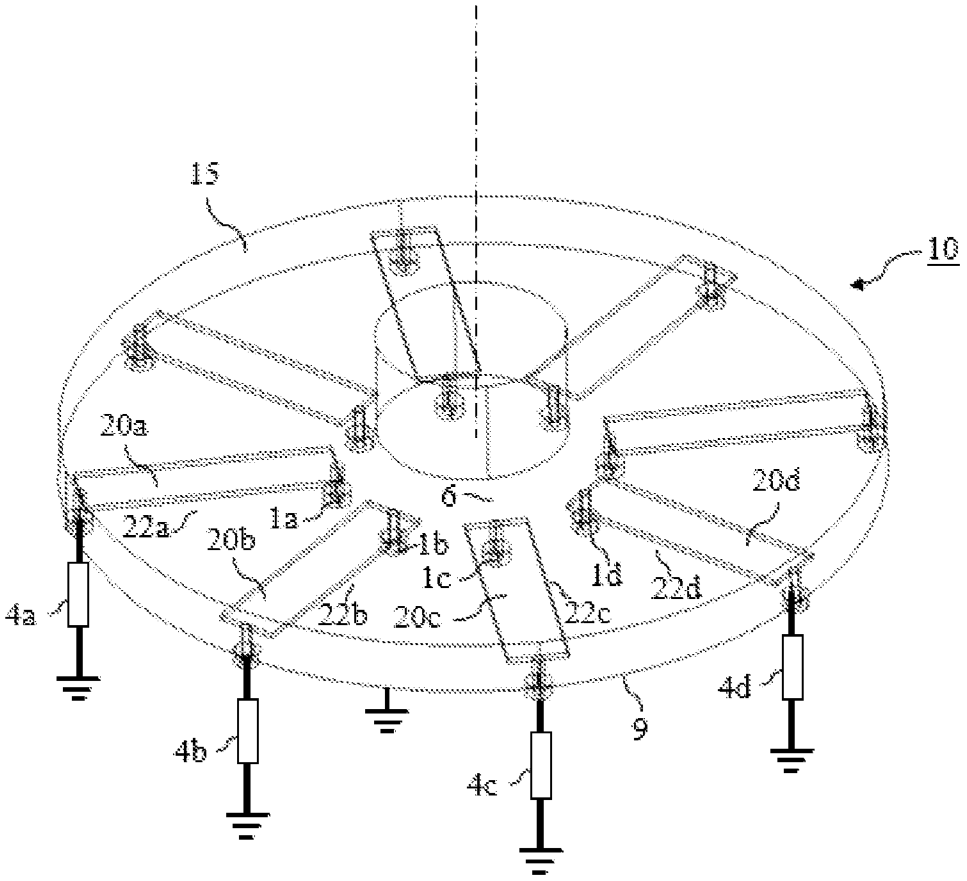
FIG. 5 schematically shows yet another exemplary electromechanical implementation of the isolating circuit of an eight-way RF power combiner according to an embodiment of the present disclosure.

FIG. 5 schematically shows another exemplary electromechanical implementation of the isolating circuit (10) of an eight-way RF power combiner according to an embodiment of the present disclosure.

The isolating circuit (10) comprises a grounded resonant cavity (15), inside which are arranged eight transmission lines (20*a*, 20*b*, 20*c*, 20*d*, . . . ). Each of the eight transmission lines has a first end respectively connected to one of eight input ports (1*a*, 1*b*, 1*c*, 1*d*, . . . ) of the combiner and an opposite second end connected to one of eight grounded resistors (4*a*, 4*b*, 4*c*, 4*d*, . . . ) which are arranged outside of the resonant cavity (15).

There are eight electrical connections respectively between the first ends of the eight transmission lines and the eight input ports (1*a*, 1*b*, 1*c*, 1*d*, . . . ).

The resonant cavity (15) may comprise eight through holes through which respectively pass the eight electrical connections.

There are also eight other electrical connections respectively between the second ends of the eight transmission lines (20*a*, 20*b*, 20*c*, 20*d*, . . . ) and the eight grounded resistors (4*a*, 4*b*, 4*c*, 4*d*, . . . ).

The resonant cavity (15) may comprise eight other holes through its base (9) through which respectively pass the eight other electrical connections to the eight grounded resistors (4*a*, 4*b*, 4*c*, 4*d*, . . . ). This allows arrangement of the eight grounded resistors (4*a*, 4*b*, 4*c*, 4*d*, . . . ) outside of the resonant cavity (15) so that they can be easily cooled and/or accessed. Alternatively, the eight grounded resistors (4*a*, 4*b*, 4*c*, 4*d*, . . . ) may be arranged inside the resonant cavity (15). Each of the eight transmission lines (20*a*, 20*b*, 20*c*, 20*d*, . . . ) is electrically coupled to a coupling portion (22*a*, 22*b*, 22*c*, 22*d*, . . . ) of the resonant cavity (15). The common floating point (6) is, in this exemplary implementation, formed by a central portion of the resonant cavity.

The implementation of FIG. 5 is analogous to the implementation of FIG. 2, except that the transmission lines (20*a*, 20*b*, 20*c*, 20*d*, . . . ) are arranged radially instead of axially and there are eight input ports and hence eight grounded resistors instead of four. In FIG. 5, only four grounded resistors are shown for clarity, the other four being arranged symmetrically.

The eight transmission lines (20*a*, 20*b*, 20*c*, 20*d*, . . . ) may each have an exemplary electrical length of λ/4 at a nominal operating frequency of the RF power combiner.

Figure 6:
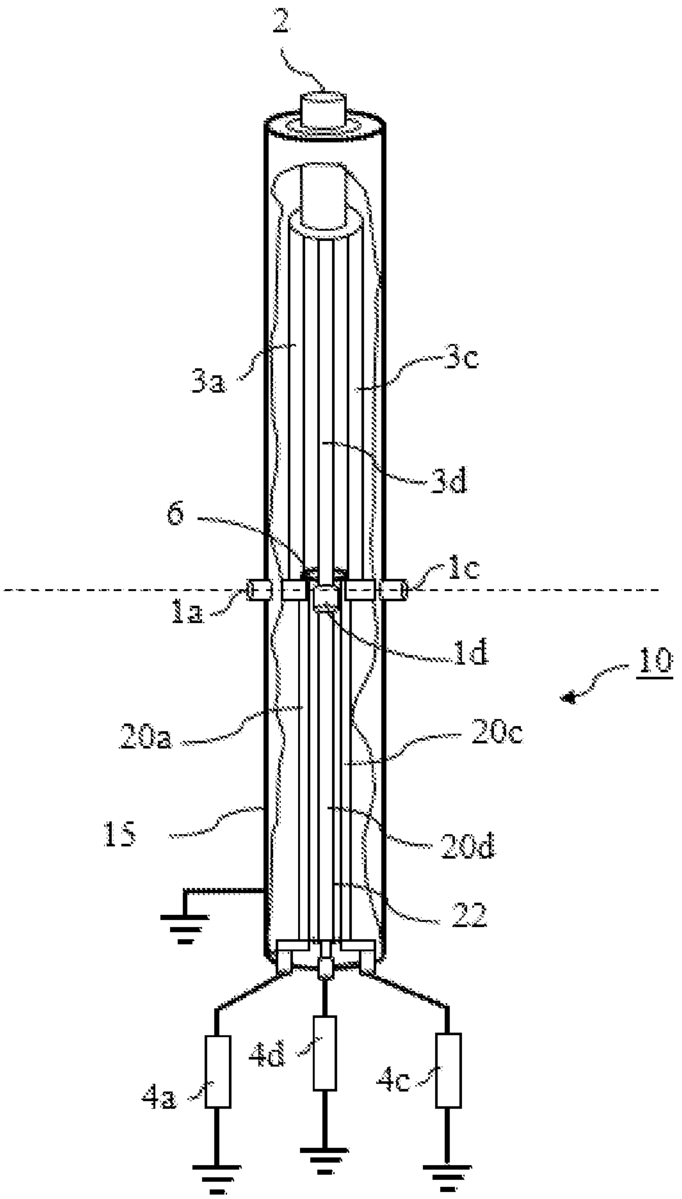
FIG. 6 shows a cutaway 3D view of an exemplary four-way RF power combiner according to an embodiment of the present disclosure.

FIG. 6 shows a cutaway 3D view of an exemplary four-way RF power combiner according to an embodiment of the present disclosure.

A lower half of the four-way RF power combiner (the part below the dotted line) comprises an isolating circuit (10) and is, for example, the same as the isolating circuit (10) shown in FIG. 2.

The upper half of the four-way RF power combiner (the part above the dotted line) corresponds to the combiner function per se and comprises the four input ports (1*a*, 1*b* (not shown), 1*c*, 1*d*) connected to a common output port (2) respectively through four impedance matching elements, which, in this exemplary implementation, are four transmission lines (3*a*, 3*b* (not shown), 3*c*, 3*d*).

In this exemplary implementation, all transmission lines (3*a*, 3*b* (not shown), 3*c*, 3*d*, 20*b* (not shown), 20*c*, 20*d*) as well as the coupling portion (22) have their longitudinal axes parallel to each other and are packed into the grounded resonant cavity (15).

As can be seen in FIG. 6, the four input ports (1*a*, 1*b* (not shown), 1*c*, 1*d*) are radially arranged through and around a middle portion of the resonant cavity (15) and the output port (2) is arranged through and at a top of the resonant cavity (15). In this exemplary implementation, the four grounded resistors (4*a*, 4*b* (not shown), 4*c*, 4*d*) are arranged outside of the resonant cavity (15) but they may alternatively be arranged inside the resonant cavity (15).

A bottom side of the four impedance matching elements (3*a*, 3*b* (not shown), 3*c*, 3*d*) (four transmission lines in this exemplary implementation) are respectively electrically connected to top sides of the four transmission lines (20*a*, 20*b* (not shown), 20*c*, 20*d*) of the isolating circuit (10).

FIGS. 2 to 6 provide several examples of practical geometrical arrangements, but it will now be understood that other geometrical arrangements can be used as well, such as, for example, using prismatic shapes instead of cylindrical or parallelepiped shapes.

Figure 7:
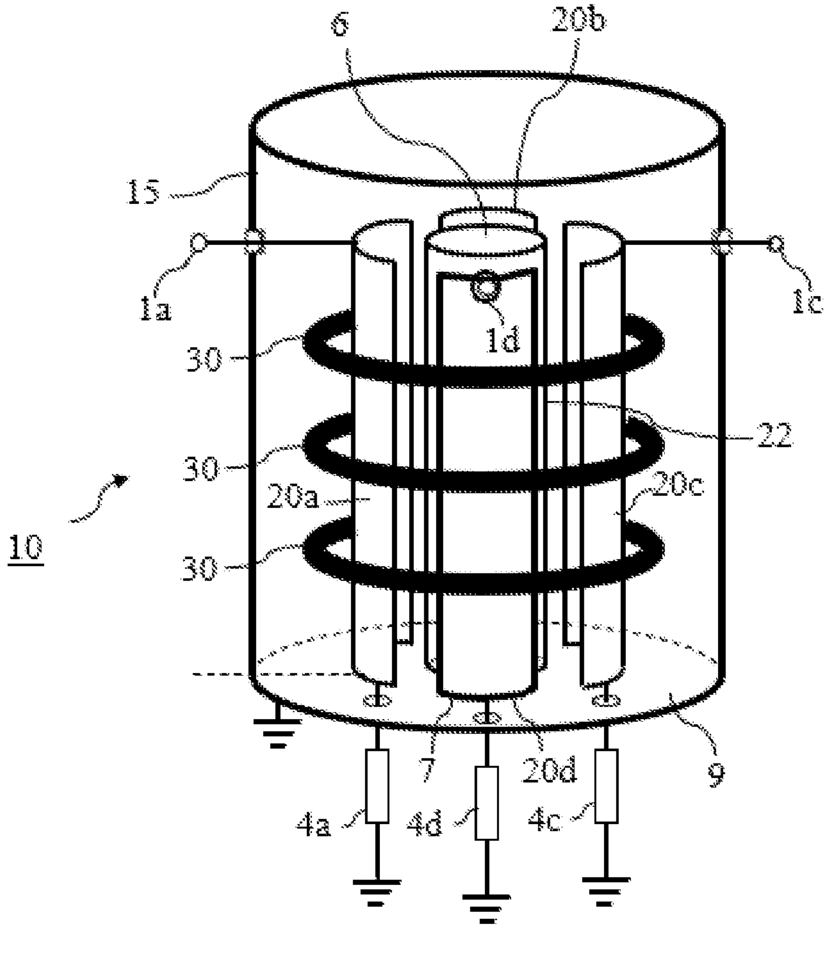
FIG. 7 schematically shows an exemplary electromechanical implementation of an isolating circuit of a four-way RF power combiner according to an embodiment of the present disclosure.

FIG. 7 schematically shows another exemplary electromechanical implementation of the isolating circuit of a four-way RF power combiner according to an embodiment of the present disclosure.

In this exemplary implementation, a plurality of ferrite rings (30) (three rings in this exemplary implementation) are arranged inside the resonant cavity (15) and around the four transmission lines (20*a*, 20*b*, 20*c*, 20*d*) of an isolating circuit (10). In some examples, a plurality of ferrite rings are arranged inside the resonant cavity and around the N transmission lines and are distributed over at least a part of a length of the N transmission lines of the isolating circuit (10). In case the coupling portion of the cavity has a parallelepiped shape, such as shown in FIG. 4, for example, the ferrite rings may have a rectangular or square shape, possibly with rounded corners, rather than a circular or oval shape.

An RF power combiner according to the present disclosure has, for example, a nominal operating frequency in the range of 1 MHz to 10 GHz and a nominal output power in the range of 1 KW to 1 MW.

In the example of FIG. 6, the isolating circuit (10) without the four grounded resistors (4*a*, 4*b*, 4*c*, 4*d*) has an exemplary length of 1 m and the complete combiner without the four grounded resistors (4*a*, 4*b* (not shown), 4*c*, 4*d*) has an exemplary length of 2 m, at an operating frequency of 75 MHz. These exemplary physical lengths may of course be decreased as the operating frequency increases.

Still in the example of FIG. 6, the resonant cavity (15) has an exemplary outside diameter of 15 cm at an operating frequency of 75 MHz and for an output power of 100 KW to 200 KW.

In any of the embodiments, the grounded resistors (4*a*, 4*b* (not shown), 4*c*, 4*d*) each have an exemplary value of 50 ohms, or an, a value of 75 ohms. The power rating of each of the grounded resistors (4*a*, 4*b* (not shown), 4*c*, 4*d*) is, for example, equal or higher than the input power per input port. The isolation between input ports is, for example, −30 dB.

The present disclosure has been described in terms of specific embodiments, which are illustrative of the present disclosure and not to be construed as limiting. More generally, it will be appreciated by persons skilled in the art that the present disclosure is not limited by what has been particularly shown and/or described hereinabove.

Use of the verbs "to comprise", "to include", "to be composed of", or any other variant, as well as their respective conjugations, does not exclude the presence of elements other than those stated.

Use of the article "a", "an" or "the" preceding an element does not exclude the presence of a plurality of such elements.

The present disclosure may also be described as follows: an RF power combiner/divider is provided, wherein the RF power combiner/divider combines a plurality of RF inputs (1*a*, 1*b*, 1*c*, 1*d*) into a combined RF output (2) and comprises an isolating circuit (10) coupling the RF inputs to a common floating point (6). The isolating circuit (10) includes a grounded resonant cavity (15) inside which transmission lines (20*a*, 20*b*, 20*c*, 20*d*) are arranged, each of the transmission lines having a first end respectively connected to one of the RF inputs (1*a*, 1*b*, 1*c*, 1*d*) and an opposite second end respectively connected to a grounded resistor (4*a*, 4*b*, 4*c*, 4*d*) arranged outside of the resonant cavity. Each of the transmission lines (20*a*, 20*b*, 20*c*, 20*d*) is coupled to a coupling portion (22) of the resonant cavity, one end of the coupling portion (22) being connected to ground and an opposite end of the coupling portion (22) forming the common floating point (6). Such an arrangement is more compact than existing arrangements, yet allowing easier cooling of the resistors (4*a*, 4*b*, 4*c*, 4*d*).

As will be appreciated by a person ordinary skilled in the art of RF combiners, a combiner according to the present disclosure can also be used as an RF splitter or divider, by using the RF output of the hereinabove described examples as an RF input and by using the RF inputs as RF outputs. The present disclosure therefore also concerns an RF splitter as described hereinabove.

What is claimed is:

1. An RF power combiner to combine N input signals into a single output signal, the RF power combiner comprising:
- N input ports connected to a common output port through N impedance matching elements respectively and
- an isolating circuit coupling the N input ports to a common floating point, wherein the isolating circuit comprises a grounded resonant cavity inside which are arranged N transmission lines,
  - each of the N transmission lines having a first end connected to one of the N input ports and an opposite second end connected to a grounded resistor arranged outside of the resonant cavity,
  - each of said N transmission lines being coupled to a coupling portion of the resonant cavity,
    - one end of the coupling portion being connected to ground and an opposite end of the coupling portion forming the common floating point.

2. The RF power combiner of claim 1, wherein the resonant cavity has a cylindrical shape,
- wherein the coupling portion has a cylindrical shape and is coaxial with the resonant cavity, and
- wherein the N transmission lines are arranged around the coupling portion and at a coupling distance from the coupling portion.

3. The RF power combiner of claim 1,
- wherein the resonant cavity has a parallelepiped shape,
- wherein coupling portion has a parallelepiped shape and is coaxial with the resonant cavity, and
- wherein the N transmission lines are arranged around the coupling portion and at a coupling distance from the coupling portion.

4. The RF power combiner of claim 1, wherein one or more ferrite rings are arranged inside the resonant cavity and around the N transmission lines.

5. The RF power combiner of claim 1,
- wherein the resonant cavity has a cylindrical shape, and
- wherein the N transmission lines are arranged radially inside the resonant cavity and at a coupling distance from the coupling portion.

6. The RF power combiner of claim 1, wherein the N impedance matching elements respectively comprise N elongated conductors arranged parallel to each other,
- first ends of the N elongated conductors being respectively connected to the first end of the N transmission lines, and
- an opposite second end of said N elongated conductors being connected together and to the common output port.

7. The RF power combiner of claim 1, wherein a base of the resonant cavity comprises N through holes through which respectively pass electrical connections between the second end of the N transmission lines and the N grounded resistors.

8. The RF power combiner of claim 1, wherein the RF power combiner has a nominal operating frequency in the range of 1 MHz to 10 GHz.

9. The RF power combiner of claim 1, wherein the RF power combiner has a nominal output power in the range of 1 KW to 1 MW.

* * * * *